United States Patent
Fleming

[11] Patent Number: 6,002,676
[45] Date of Patent: Dec. 14, 1999

[54] METHOD AND APPARATUS FOR SELECTING A RESOURCE IN A COMMUNICATION SYSTEM WITH RESOURCES HAVING UNBALANCED LOAD CAPACITY

[75] Inventor: Philip J. Fleming, Glen Ellyn, Ill.

[73] Assignee: Motorola, Inc., Schaumburg, Ill.

[21] Appl. No.: 08/885,163

[22] Filed: Jun. 30, 1997

[51] Int. Cl.[6] .................................................. H04J 13/00
[52] U.S. Cl. ...................... 370/328; 370/320; 370/342; 370/441; 370/479; 455/67.1; 455/450; 455/513
[58] Field of Search ......................... 370/328, 347, 370/352, 395, 400, 320, 335, 342, 441, 4.79, 329, 330, 331, 338, 230, 248, 252; 455/13.1, 13.3, 67.1, 560, 450–453, 509, 513, 524; 379/124, 220, 60

[56] References Cited

U.S. PATENT DOCUMENTS

| | | | |
|---|---|---|---|
| 4,670,899 | 6/1987 | Brody et al. ......................... | 379/60 |
| 5,054,111 | 10/1991 | Goodwin ............................. | 455/509 |
| 5,477,538 | 12/1995 | Huenlich ............................. | 370/395 |
| 5,666,356 | 9/1997 | Fleming et al. ....................... | 370/328 |
| 5,717,737 | 2/1998 | Doviak et al. ........................ | 370/338 |
| 5,727,051 | 3/1998 | Holender ............................. | 370/248 |
| 5,749,044 | 5/1998 | Natarajan et al. .................... | 455/13.1 |
| 5,844,886 | 12/1998 | Szentesi ............................... | 370/230 |
| 5,912,884 | 6/1999 | Park et al. ........................... | 370/331 |

Primary Examiner—Douglas W. Olms
Assistant Examiner—Shick Hom
Attorney, Agent, or Firm—Sayed Hossain Beladi

[57] ABSTRACT

The method of selecting one of the resources for servicing a call includes determining a load level and a relative load capacity for each of candidate resources. The relative load capacity is based on a ratio of each candidate resource load capacity and total load capacity of all candidate resources. The candidate resource is selected by a relative ranking based on multiplication of each resource with each respective load level and each relative load capacity determination.

12 Claims, 3 Drawing Sheets

METHOD AND APPARATUS FOR SELECTING A RESOURCE IN A COMMUNICATION SYSTEM WITH RESOURCES HAVING UNBALANCED LOAD CAPACITY

FIELD OF THE INVENTION

The present invention relates to distributing load in a multicarrier communication system, particularly, a code division multiple access (CDMA) system with unbalanced load capacities between its resources.

BACKGROUND OF THE INVENTION

A code division multiple access (CDMA) cellular communication system normally has several radio frequency (RF) carriers. Each RF carrier is considered a resource for serving incoming calls. The incoming calls or the calls in progress served by a system resource is the load of that resource. Each resource has a load capacity.

The communication system may have a total loading capacity far more than what is required to maintain an optimum Frame Error Rate (FER) on all channels. Because the total load capacity may not be distributed evenly among all the RF carriers, or the RF carriers may be loaded unevenly, the FER is degraded for at least a period of time every time a new call is established on a carrier having a load level that is marginal for maintaining an optimum Frame Error Rate (FER). Other carriers may be available, however, which have an acceptable margin between the load level and the load capacity. As a result, an imbalance in loading capacity between RF carriers creates an environment for inefficient utilization of the total system loading capacity.

One suggestion to control loading of a system has been to load the carriers based on a ranking. The ranking of the carriers is based on the availability of resources and the load level of each carrier. For example, the best candidate is selected according to a minimum amount of load and the maximum amount of resources available for processing an incoming call. However, the initial control of a call setup on a carrier does not just effect that particular carrier per se; its effect uncontrollably propagates to carriers on the adjacent cells and sectors of the communication system.

For example, Interim Standard (IS)-95 CDMA communication standard, published by the Telecommunications Industry Association in Washington, DC, along with subsequent revisions thereof, requires the communication system to establish links on some of the adjacent cells or sectors for soft hand-offs. If the RF carrier load level in the adjacent cells or sectors is marginal with respect to its load capacity, these uncontrollable RF carrier assignments on adjacent cells or sectors may cause severe FER degradation. Thus, although a controlled method of initial call set up is devised, its effect on the RF carriers in the adjacent cells and sectors of the communication systems could be uncontrollable.

Therefore, there is a need to efficiently utilize the total loading capacity of a system when an imbalance of loading capacity exists among RF carriers, sectors or cells of the communication system.

DETAILED DESCRIPTION OF THE PREFERRED EMBODIMENT(S)

In a communication system comprising a plurality of candidate resources responsible for servicing calls, a method of selecting one of the resources for servicing a call includes determining a load level and a relative load capacity for each of candidate resources. The relative load capacity is based on a ratio of each candidate resource load capacity and total load capacity of all candidate resources. The candidate resource is selected by a relative ranking based on multiplication of each resource load level and corresponding relative load capacity determinations. The selected resource may have the lowest value of the multiplication among said plurality of candidate resources.

In other aspects of the present invention, the method of determining load level is based on one of an instantaneous and average measure of load levels. Further, the method of determining relative load capacity is based on one of a static and a dynamic load capacity. The dynamic load capacity may be based on one of instantaneous and average measurement of dynamic load capacity.

The candidate resources are a plurality of candidate radio frequency carriers, sectors, cells, and sub-systems in the communication system.

The communication system is a Code Division Multiple Access system. The communication system includes a plurality of radio frequency stations, and a controller system for controlling said plurality of radio frequency stations for setup a caller by selecting one radio frequency station among the plurality of radio frequency stations to service the caller. The selection is according to a ranking of said plurality of radio frequency stations. The communication system may have at least two coexisting subsystems of different types, like Code Division Multiple Access and Time Division Multiple Access systems. The communication system controller further includes a function of selecting one of the coexisting communication subsystems to service the caller.

The hardware limitations of a communication system set the maximum level of static loading capacity at each radio frequency (RF) carrier. In theory, in a CDMA system, the maximum number of users that may load an RF carrier is determined by the maximum number of Walsh codes available to the RF carrier. In such a communication system, RF carriers at one segment of the spectrum may not be supported by hardware that has the same limitation as hardware supporting other RF carriers in other segments of the spectrum. Therefore, the communication system is likely to have a static imbalance of loading capacity among its RF carriers, the imbalance of which extends to the overall communication system loading capacities at sectors or cells.

Figure 1:
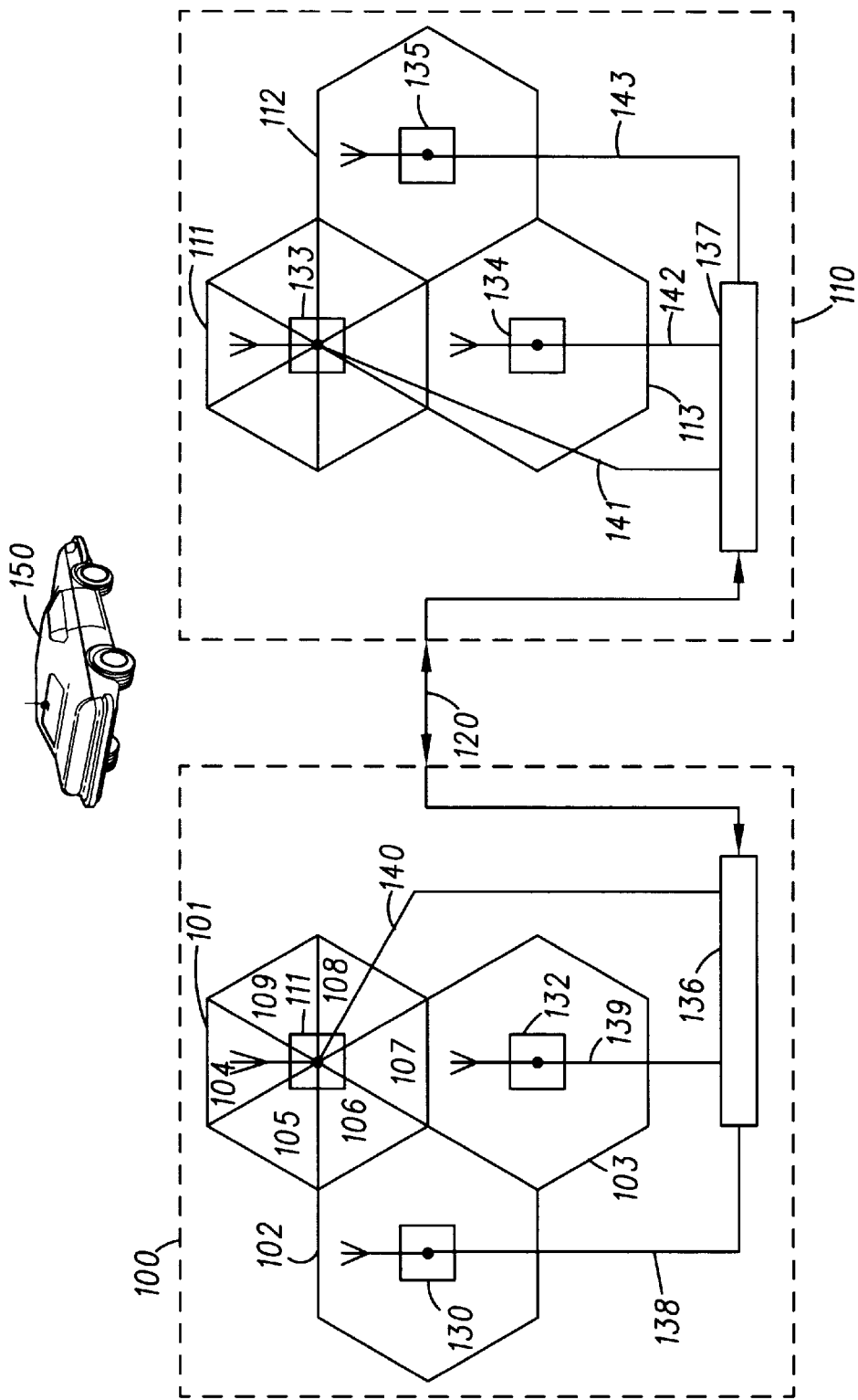
FIG. 1 generally depicts organization of a cellular communication system coverage including subsystems, cells, and sectors.

With reference to FIG. 1, a communication system 100 is normally comprised of several cells 101, 102, and 103 which provide wireless communication coverage to mobile units, like radio telephone 150, over a wide geographic area. An adjacent system 110 having cells 111, 112 and 113 may provide similar services to callers like 150. Each cell is dedicated to serve at least one geographic area. Although the cells are shown to be neatly organized in FIG. 1, in reality, the cell boundaries are not defined clearly and one or more overlap of coverage areas between the cells may be present.

Each cell is divided into several sectors. For example, cell 101 has sectors 104, 105, 106, 107, 108 and 109. Each sector is then dedicated to serve a number of calls made within the cell coverage area. A sector normally includes an RF section for receiving or transmitting RF carriers. With reference to FIG. 1, RF sections 130–135 are shown, where each RF section serves one cell. A number of RF carriers are dedicated to each cell at a given time. The system 100 and 110 have controllers, 136 and 137, comprising of a mobility manager and a mobile switching center controlling each cell of the communication system. It is shown that there is a connection between each cell and the corresponding system controller. In addition, it is conceptually shown that the system 100 and 110 controllers are linked through a connection 120.

When a call is first set up, the communication system 100 or 110, through its controller 136 or 137, would evaluate all available cells, sectors, and RF carriers before an RF carrier in a given sector and given cell is decided to serve the call. In case of several coexisting communication systems connected through connections like connection 120, the function of controller, 136 and 137, further includes a function of deciding which system may serve the call.

The imbalance of the loading capacity may also be due to the dynamics of the communication system operations. For example, a CDMA system loads one sector or a cell or a group of RF carriers more than another due to many particulars of the system dynamics. Examples of the system dynamics that may affect the loading capacity include proximity of the users to a particular cell or sector, transmit power levels among the users of the system, mobility of users with respect to each other and the system location, RF carriers' multipath effects, and RF environment.

Generally, there is a correlation between the static and dynamic loading capacities. The dynamic loading capacity, by a margin, is less than the static loading capacity. The margin is maintained for an FER of the communication between, for example, a mobile and a base station. If the load level increases to exceed the dynamic loading capacity, then there is less than optimum margin with respect to the static loading capacity, and severe degradation in system FER is created. The voice quality of the communication link, therefore, is adversely effected by degradation in the system frame error rate (FER).

Figure 2:
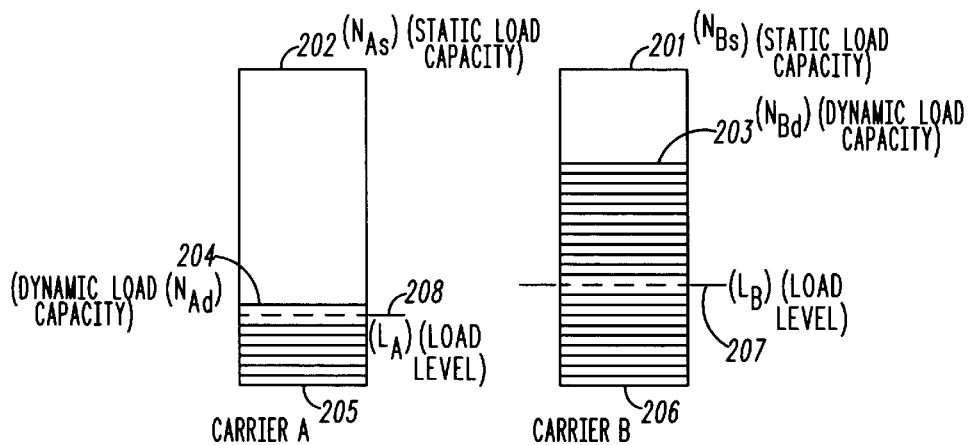
FIGS. 2 and 3 generally depict radio frequency carriers having particular load levels and capacities.

FIG. 2 illustrates one aspect of the present invention where a communication system having two carriers A 205 and B 206 is shown. The carriers' static load capacities are equal and shown for carrier A 205 to be at NAs 202 level and for carrier B 206 at level NBs, 201. Due to system dynamics as explained above, it is shown that carrier 205 has an actual or average dynamic loading capacity at a level NAd 204 which is shown to be less than the actual or average dynamic loading capacity level NBd 203 of carrier 206. The actual or average load levels of carriers 206 and 205 are at levels LB 207 and LA 208 respectively.

When a call is being initially setup, the system has a choice of assigning the service of that call to either carrier A 205 or carrier B 206. If the call is assigned to carrier 205, the load level LA 208 is incremented by one call. If the load level LA 208 is close to dynamic load capacity NAd 204, a severe degradation in FER is experienced by assigning the new call to carrier A 205. On the other hand if the call is assigned to carrier B 206, the load level LA 207 is incremented by one call; and If the load level LA 207 is not close to the dynamic load capacity NBd 203, a severe degradation in FER is not experienced.

In accordance with one aspect of the present invention, a carrier is selected for handling a call based on a ratio of load capacities or load levels of the available carriers.

For example, a new call may be assigned to a carrier while the following ratios are maintained to be equal.

$$NAd/NBd = LA/LB \quad (1)$$

That is, if a new call is to be serviced, the system evaluates the dynamic loading capacities NAd and NBd of each carrier, 205 and 206, before a carrier is assigned to that call. By first evaluating the value of the right hand side of the equation (1), and then assigning the call to either carrier A 205 or carrier B 206 such that the ratios in equation (1) are maintained to be equal. As a result, the total system capacity is utilized more efficiently and FER degradation in the system is thereby avoided.

Figure 3:
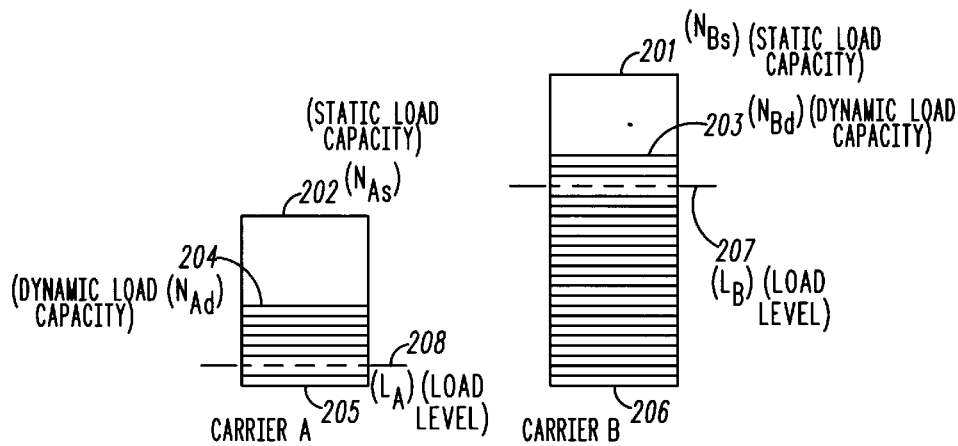

With reference to FIG. 3, carriers 205 and 206 have respectively different levels of static loading capacities, NAs 202 and NBs 201, and dynamic load capacities NAd 204 and NBd 203. Generally, the ratios of dynamic load capacities are correlated to corresponding ratios of static load capacities. As a result of this correlation, and according to one aspect of the present invention, a carrier may be assigned to serviced a new call while maintaining the following ratios:

$$NAs/NBs = LA/LB \quad (2)$$

Most communication systems have more than two RF carriers. Thus in a further aspect of the present invention, a carrier may be selected for servicing a new call according to the relationship shown mathematically and graphically in FIG. 3. The mathematical relationship is shown here by equation (3).

$$\alpha i = 1 \bigg/ \left( Ni \bigg/ \sum_{i=1}^{k} Ni \right); \quad S = \operatorname{argmin}\{\alpha i Li\}; \quad i = 1, k. \quad (3)$$

Figure 4:
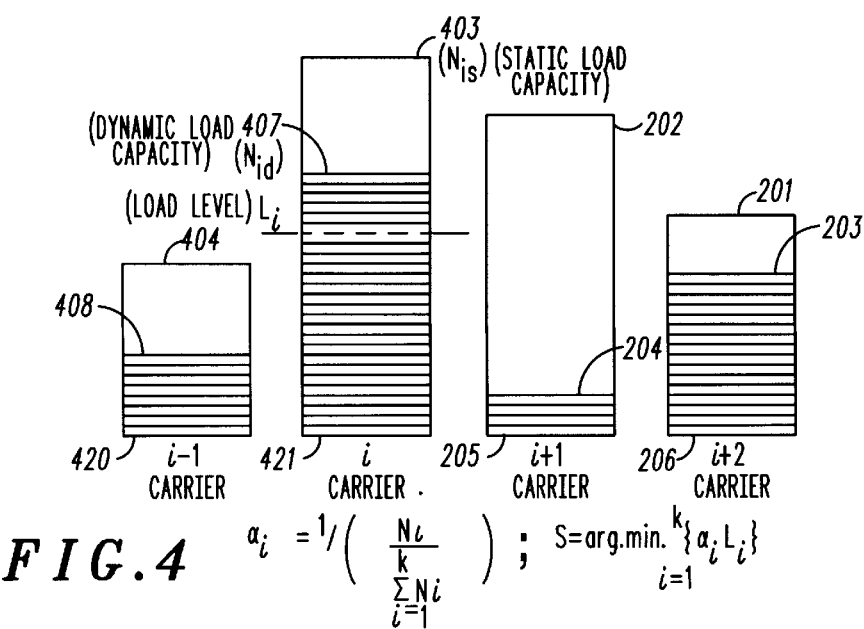
FIG. 4 generally depicts a plurality of radio frequency carriers with respective load levels and capacities.

With reference to FIG. 4, carriers 420 and 421 are shown in addition to carriers 205 and 206 in previous FIGS. 2 and 2. Each carrier, 420, 421, 205 and 206, has a static and a dynamic load capacity. The levels of static load capacities are shown at 404, 403, 202 and 201. The levels of dynamic load capacities are shown at 408, 407, 204 and 203. In the equation (3), the static and dynamic load capacities are designated as "Nis" and "Nid" respectively. The designator "i" represents a number designating a carrier. The static load capacity of a carrier, "Nis", is easily measured by knowing the limitations of hardware resources available to that carrier. The dynamic load capacity, "Nid", of a carrier is measured by the total number of calls in progress at a given FER level. For example, the system designer may require a Frame Error Rate level for maintaining voice quality at an acceptable level. Thus, the value of number of calls in progress is the dynamic load capacity "Nid" which is set at such a point allowing the operation of the system at the acceptable FER. Another method of measuring "Nid" is to measure the number of calls in progress at a given percentage of dropped calls. The number of calls in progress measured at the required percentage of dropped calls is the dynamic load capacity "Nid". The measure of the "Nid" in the present invention is not limited to the examples given here. The dynamic load capacity can be defined and measured by other similar methods in association with the communication system.

Still referring to the equation (3), each carrier has a load level "Li". The load level "Li" may be either the actual instantaneous or average measurement of the load level as represented by the number of calls on carrier "i". Another method of measuring load level is the transmit power level of the carrier. A linear power amplifier peak capacity level is set at a level to be representative of a dynamic or static capacity of that carrier. Thus, if the linear power amplifier is operating at 65% below the peak capacity for a carrier, the load level for that carrier is at 35%. Or, the number of all forward links on a carrier can be measured for indication of the load level "Li". In addition, there are other direct or indirect ways of measuring load level of a carrier.

A relative load capacity parameter, "$\alpha i$", is calculated according to equation (3) for every carrier "i". There are "k" number of carriers. Therefore, there is a relative load capacity parameter, "$\alpha i$", for every carrier from i=1 to k. In equation (3), the parameter "Ni" may be based on either static or dynamic load capacity; and when one basis is selected, that basis is used uniformly for measuring "Ni" of every carrier for the purpose of the equation (3). As the equation (3) shows, the relative load capacity parameter is a parameter representing relative load capacity of a carrier with respect to all other carriers. Therefore, the actual load capacity of a carrier or the carrier's relative load capacity to other carriers need to be known.

The load level, "Li", is multiplied by corresponding relative load capacity parameter, "$\alpha i$", for every carrier from i=1 to k. The "Li" and "$\alpha i$" is multiplied for each carrier, i=1 to K. The carrier "$\alpha i$", among all other carriers, that has the minimum multiplication result is the best carrier for assigning the services of the new call according to the present invention. The operation of the equation (3) is shown by a way of example as follows. The carriers i=1, 2, and 3 have Ni equal to 10, 7, and 4 respectively. Thus, the $\alpha i$ for i=1, 2, and 3 would be 2.1, 3, and 5.25 respectively. If the Li for i=1, 2, and 3 is equal to 6, 2, and 3 respectively, Li$\alpha i$ for i=1, 2, and 3 would be 12.6, 6 and 15.75. According to the present invention, since carrier i=2 has the lowest value for Li$\alpha i$, it is selected as the carrier to service the call.

The various aspects of the present invention may be used to select a particular sector of a cell to serve a call by one of the RF carriers available in the selected sector. Similarly, the present invention may be used to select a cell of a communication system, the communication system having a number of available cells, for servicing a new call by one of the RF carriers in one of the sectors in the selected cell.

Further, the communication system technology allows simultaneous operation of two or more communication systems in one area. Therefore, when a new call is to be serviced, the present invention may be used to select one of the available systems to service the new call.

Figure 5:
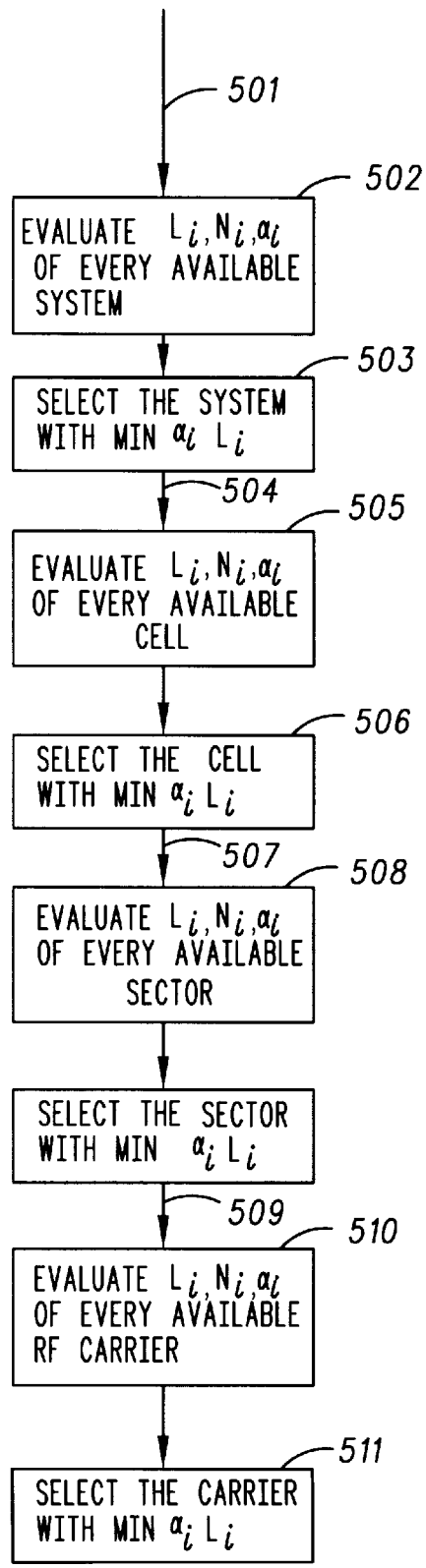
FIG. 5 generally depicts a flow chart outlining a call assignment in a cellular communication system.

The methods of selecting a communication system, a cell, a sector, and an RF carrier to service a new call are very similar. With reference to FIG. 5, a process of selecting an RF carrier to serve an incoming call is shown by way of a flow chart. If more than one communication system is available, the process may begin at 501. If only one system is available or it is known which system is going to serve the incoming call, the process of selection may begin at 504. If a specific cell is known to be serving the incoming call, the process of selection may start at 507. Finally, if the call is routed to a specific sector, the process of selection may begin at 509.

For example, in case of having a plurality of available communication systems, the "Ni" in equation (3) is either the total static or dynamic load capacity of each system, i=1 to k. The "Li" is the total load level of each communication system, i=1 to k. The relative load capacity parameter, "$\alpha i$", is calculated for each communication system, i=1 to k. Then, the communication system that has the lowest value of multiplication of corresponding "$\alpha i$" and "Li", for i=1 to k, is selected as the system for servicing the new call.

At the cell level, the "Ni" in equation (3) may be either the total static or dynamic system capacity of each cells, i=1 to k. The "Li" is the load level of each cells, i=1 to k. The "$\alpha i$" is calculated for each cell, i=1 to k. Then, the cell that has the lowest value of multiplication of corresponding "$\alpha i$" and "Li", for i=1 to k would be selected as the cell for servicing the new call.

At the sector level, the "Ni" in equation (3) may be either the total static or dynamic system capacity of each sector, i=1 to k. The "Li" is the total load level of each sector, i=1 to k. The "$\alpha i$" is calculated for each sector, i=1 to k. Then, the sector that has the lowest value of multiplication of corresponding "$\alpha i$" and "Li", for i=1 to k, is selected as the sector for servicing the new call.

The total load level, "Li", or total load capacity, "Ni", of a communication system, a cell, or a sector is calculated based on accumulating divisible load level or load capacity that can be measured within the communication system. The least divisible load level or load capacity, for example, is what is measured for an RF carrier. The "Li" and "Ni" of all RF carriers in a sector, a cell, or a communication system, are added to represent, correspondingly, the total "Li" and "Ni" of a sector, a cell, or a communication system.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

I claim:

1. In a communication system comprising a plurality of candidate resources responsible for servicing calls, a method of selecting one resource from said plurality of candidate resources for servicing a call to be setup by said communication system, comprising the steps of:

determining a load level for each candidate resource of said plurality of candidate resources;

determining a relative load capacity for each candidate resource of said plurality of candidate resources, wherein said each relative load capacity is based on a ratio of each candidate load capacity and total load capacity of said plurality of candidate resources; and selecting said one resource based on a relative ranking of said plurality of candidate resources, wherein said relative ranking is based on a multiplication of each resource from said plurality of candidate resources, with each respective load level and respective relative load capacity determination, wherein said load level is determined from one of an instantaneous and average measure of said load level.

2. The method as recited in claim 1, wherein said relative load capacity is determined based on one of a static load capacity and a dynamic load capacity.

3. The method as recited in claim 2, wherein said dynamic load capacity is based on one of instantaneous and average dynamic load capacity.

4. The method as recited in claim 1, wherein said one resource has a lowest value of said multiplication among said plurality of candidate resources.

5. The method as recited in claim 1 wherein said plurality of candidate resources are a plurality of candidate radio frequency carriers in said communication system.

6. The method as recited in claim 1 wherein said plurality of candidate resources are a plurality of candidate sectors in said communication system.

7. The method as recited in claim 1 wherein said plurality of candidate resources are a plurality of candidate cells in said communication system.

8. The method as recited in claim 1 wherein said plurality of candidate resources are a plurality of candidate sub-communication systems in said communication system, and wherein said plurality of candidate sub-communication systems are different types of communication systems.

9. The method as recited in claim 1 wherein said communication system is a Code Division Multiple Access system.

10. A communication system, comprising:

a plurality of radio frequency stations;

a controller system for controlling said plurality of radio frequency stations for setup a caller on said communication system by selecting one radio frequency station from a plurality of radio frequency stations to service said caller according to a relative ranking of said plurality of radio frequency stations, wherein said relative ranking is based on a multiplication of each resource from a plurality of candidate resources, with each respective load level and respective relative load capacity, wherein said communication system is comprised of a plurality of coexisting communication systems including a code division multiple access communication system.

11. The communication system as recited in claim 10 wherein at least two of said plurality of coexisting systems are different types.

12. The communication system as recited in claim 10 wherein said controller further includes function of selecting one of said plurality of coexisting communication systems to service said caller.

* * * * *